United States Patent

Kurokawa et al.

[11] Patent Number: 5,191,445
[45] Date of Patent: Mar. 2, 1993

[54] IMAGE READER

[75] Inventors: Hiromitsu Kurokawa, Yokosuka; Tadayoshi Miyoshi, Yokohama; Takashi Kuriyama, Yokohama; Ichiro Shishido, Yokohama, all of Japan

[73] Assignee: Victor Company of Japan, Ltd., Yokohama, Japan

[21] Appl. No.: 563,923

[22] Filed: Aug. 7, 1990

[30] Foreign Application Priority Data

Aug. 8, 1989 [JP] Japan .................................. 1-205246

[51] Int. Cl.⁵ .............................................. H04N 1/40
[52] U.S. Cl. ................................... 358/461; 358/448; 358/447
[58] Field of Search ............... 358/446, 447, 448, 452, 358/461, 463, 483, 464, 474, 482

[56] References Cited

U.S. PATENT DOCUMENTS 4,511,928  4/1985  Colomb ........................ 358/448
4,660,082  4/1987  Tomohisa et al. ............. 358/447
5,130,822  7/1992  Nagata et al. ................. 358/461

Primary Examiner—Edward L. Coles, Sr.
Assistant Examiner—Jerome Grant, II
Attorney, Agent, or Firm—Michael N. Meller

[57] ABSTRACT

There is provided an improved image reader. In the image reader, light from an object is converted into an analog signal by a photoelectric converter. The signal is quantized by an A/D converter on the basis of top and bottom reference voltages to produce a digital picture signal. A digital picture signal corresponding to a dark current flowing to the photoelectric converter is stored in a memory as a dark current data. Also a digital picture signal corresponding to the optical strength of predetermined level is stored in another memory as a white level data. Then, the top and bottom reference voltages are produced which correspond to the top and bottom quantization-threshold values on the basis of the dark current and white level data, respectively. The top and bottom reference voltages are then respectively applied to the A/D converter to produce the digital picture signal without signal distortion.

2 Claims, 1 Drawing Sheet

IMAGE READER

BACKGROUND OF THE INVENTION

The present invention relates to an improved image reader.

An image reader produces a picture signal by converting light from an object into an electrical signal for each picture element by means of a photoelectric conversion device. However, the picture signal thus produced includes a distortion component (shading) caused by non-uniformity of the optical strength from a light source, variation of the optical strength-distribution from an optical system and differences of sensitivity between elements constituting the photoelectric conversion device.

An image reader in which a photoelectrically converted picture signal is converted into a digital siganl by an A/D (analog-to-digital) converter has adopted a method for eliminating the shading as follows.

First, light reflected at a standard white board is photoelectrically converted into an analog signal. The analog signal is converted into a digital signal to be stored in a compensation memory prior to image-reading.

Then, a picture signal is produced by actual image-reading, digitized and multiplied by the signal stored previously in the compensation memory corresponding outputs from each element or picture element of the image reader to compensate for the shading.

This system requires a digital multiplier for shading-compensation. Furthermore, when the number of quantized bits is large, the number of digits required for calculation increases greatly. This results in the circuit configuration of the system becoming complex.

Moreover, the photoelectric conversion device has a problem for the accuracy of analog-to-digital conversion due to the dark current if a picture signal with a large gradation is to be produced or if the number of quantized bits is to be made large.

SUMMARY OF THE INVENTION

In view of the above, the present invention is intended to provide an image reader for producing a digital picture signal without shading and the dark current effect of a photoelectric conversion device.

In the image reader according to the present invention, light from an image or a document to be read is applied to the photoelectric conversion device which converts the light into an electrical signal. The electrical signal thus converted is quantized to be a digital picture signal which is taken out from the image reader.

The outputs corresponding to the dark current and a standard white board of each conversion element constituting the photoelectric conversion device are respectively stored in memories prior to image-reading. Then, analog-to-digital conversion is performed with compensation of a quantization-threshold level (the number of quantization steps) performed by means of the outputs that have been stored beforehand.

In one preferred mode of the present invention, the image reader used comprises:

a photoelectric conversion means having at least one photoelectric conversion element for converting light from an object into an analog signal by means of the element;

an analog-to-digital conversion means for quantizing the analog signal quantization-threshold values on the basis of top and bottom reference voltages applied thereto to produce a digital picture signal;

a control means for producing a signal to control data-writing prior to image-reading and another signal to control data-reading in the image-reading;

a dark current data memory means for memorizing the digital picture signal corresponding to the value of a dark current flowing to the photoelectric conversion element as a dark current data when the signal to control data-writing is applied thereto and producing the dark current data when another signal to control data-reading is applied thereto;

a white level data memory means for memorizing a digital picture signal corresponding to the optical strength of predetermined level as a white level data when the signal to control data-writing is applied thereto and producing the white level data when another signal to control data-reading is applied thereto;

a bottom reference voltage generation means for generating a bottom reference voltage corresponding to the bottom quantization-threshold value on the basis of the dark current data produced by the dark current-data memory means; and a top reference voltage gereration means for generating a top reference voltage corresponding to the top quantization-threshold value on the basis of the white level data produced by the white level-data memory means, wherein the bottom and top reference voltages are respectively applied to the analog-to-digital conversion means to produce a digital picture signal without signal deformation.

Other objects and advantages of the present invention will become apparent from the detailed description to follow, in conjunction with the appended claims.

DESCRIPTION OF THE PREFERRED EMBODIMENT

Figure 1:
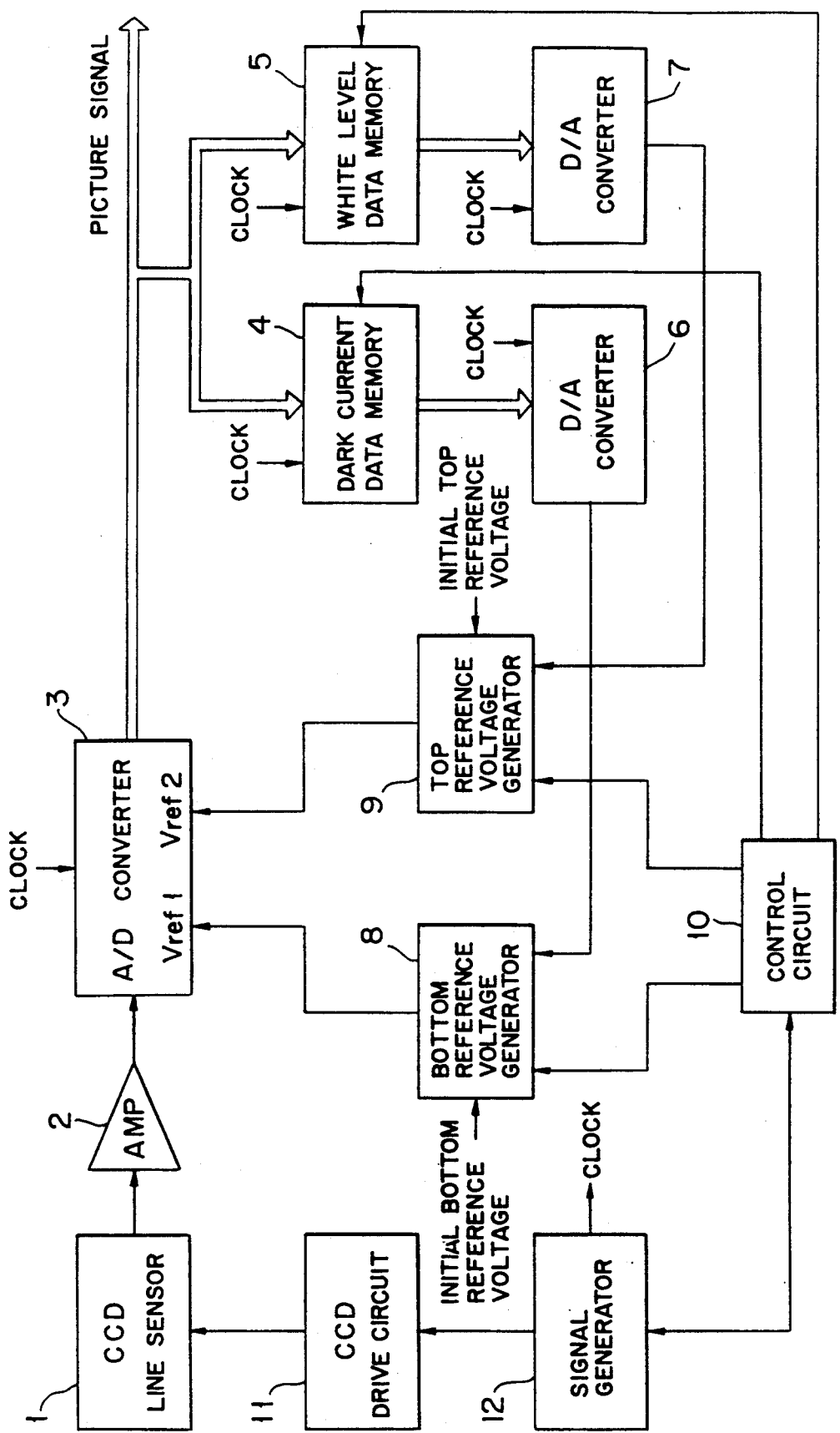
FIG. 1 is a block diagram showing an image reader according to the present invention.

The present invention will now be described in detail with reference to the accompanying drawing.

In FIG. 1, a CCD line sensor 1 as a photoelectric conversion device for image-reading sequentially applies signals photoelectrically converted by each of its components sensor element to an amplifier 2 when a drive signal is applied to the sensor 1 from a CCD drive circuit 11.

The signals amplified by the amplifier 2 are applied by an A/D converter 3 and quantized there to become digital picture signals. A quantization-threshold level of the A/D converter 3 is decided by a bottom reference voltage Vref1 and a top reference voltage Vref2.

For example, the step size of quantization may be decided by dividing a voltage difference between $Vref_1$ and $Vref_2$ by the quantization-threshold level and then $Vref_1$ plus a voltage corresponding to one step size equals the lowest threshold level for quantization, and so forth.

The digital picture signals produced by the A/D converter 3 are applied to a dark current data memory 4 and a white level data memory 5. A control circuit 10 produces control signals to control data-reading/writing to those memories 4 and 5.

Signals produced by the dark current data memory 4 are applied to a D/A (digital-to-analog) converter 6 to be converted into analog signals.

The analog signals thus converted and an initial bottom reference voltage which may be distributed by a supply voltage are applied to a bottom reference voltage generator 8 to produce the bottom reference voltage Vref1.

The control circuit 10 applies a control signal to the generator 8 to select the initial bottom voltage or the analog signals converted by the D/A converters 6 as a reference voltage so as to produce the bottom reference voltage Vref1. The top reference voltage Vref2 is produced in the same way through the white level memory 5, a D/A converter 7 and a top reference voltage generator 9.

A signal generator 12 is governed by the control circuit 10 to produce clock pulses for the entire system and several control signals for operation of the system.

Prior to image-reading, a shutter is shut off or a light source is cut off to cancel the optical input to the sensor 1 in order to check variation of the dark current of each sensor element of the sensor 1 and their sensitivity and also the intensity distribution of the light source. Neither the shutter nor the light source are shown.

Then, the CCD drive circuit 11 applies the drive signal to the sensor 1 so as to sequentially apply the output of each sensor element to the A/D converter 3. The output of the A/D converter 3 corresponds to the dark current of each sensor element.

The control circuit 10 selects the initial bottom and top reference voltages as the reference voltages for the bottom and top reference voltage generators 8 and 9, respectively. The initial bottom and top reference voltages may be decided by the values recommended by a catalogue of the A/D converter used as the A/D converter 3.

As a result, the bottom and top reference voltages Vref1 and Vref2 are produced by the generators 8 and 9 and then applied to the A/D converter 3, respectively.

The A/D converter 3 quantizes the input corresponding to the dark currents on the basis of the voltages Vref1 and Vref2. The data produced by the A/D converter 3 are sequentially stored into the dark current data memory 4 when a write signal is applied to the memory 4 from the control circuit 10. This process is completed when all data of the dark currents for one line of the CCD line sensor 1 or all the elements thereof are stored into the memory 4.

Next, light from a standard white board not shown is applied to the sensor 1. The output of each sensor element is sequentially applied to the A/D converter 3. The A/D converter 3 performs A/D conversion on the basis of a quantization-threshold level which is compensated for on the basis of the data of the dark current as follows.

First, the data of the dark current of the sensor element which is the same as that produced by the signal to be A/D converted is read from the memory 4 under the control of the control circuit 10. The data thus read is converted into an analog signal by the D/A converter 6.

Then, the analog signal is applied to the generator 8. The generator 8 switches its reference value to the input from the D/A converter 6 from the initial bottom reference voltage. The compensated bottom reference voltage Vref1 is thus applied to the A/D converter 3.

The A/D converter 3 determines the quantization-threshold level on the basis of compensated voltage Vref1 and the top reference voltage Vref2 (corresponding to the initial top reference voltage). Then, the A/D converter 3 quantizes the signals produced by reading the standard white board.

The outputs of the A/D converter 3 are sequentially stored into the white level data memory 5 element by element when the control signal is applied thereto from the control circuit 10.

Compensated bottom reference voltages Vref1 of the sensor elements are different from each other. Therefore, the quantization-threshold level is also compensated per sensor element. This process is completed when all the data of the sensor elements are stored into the memory 5.

When light from an image or a document to be read is applied to the CCD line sensor 1, the outputs of the sensor elements are scanned and applied to the A/D converter 3 through the amplifier 2 sequentially by the drive signal from the CCD drive circuit 11.

The A/D converter 3, the quantization-threshold level of which is compensated on the basis of the data stored in the memories 4 and 5 quantizes the outputs of the sensor elements as follows.

First, the data for the dark current and the white level of the element corresponding to that producing the signal to be converted are read from the memories 4 and 5, respectively. The two data are converted into analog signals by the D/A converters 6 and 7 and applied to the generators 8 and 9 as the reference voltages, respectively.

The generators 8 and 9 produce the bottom and top reference voltages Vref1 and Vref2 on the basis of the reference voltages and apply them to the A/D converter 3, respectively. Then, the A/D, converter 3 quantizes the input signals according to the compensated quantization-threshold level on the basis of the voltages Vref1 and Vref2. Reading out the data for the dark current and the white level and switching the reference voltages are controlled by the control signals from the control circuit 10.

Therefore, the output signals produced by quantizing the picture signal are such that the variation of the dark current and the sensitivity per sensor element are compensated.

The size of compensation calculation increases greatly with the increase of the quantization-threshold level in the conventional method wherein data are compensated for after quantization.

Compared to that, in the present invention, quantization is performed according to the quantization-threshold level being compensated, and is sufficient to increase the numbers of bits of such as the memories 4 and 5 and the D/A converters 6 and 7. Therefore, the circuit configuration can be made smaller, according to the present invention.

What is claimed is:

1. An image reader comprising:
   photoelectric conversion means having at least one photoelectric conversion element for converting light into an analog signal by means of said element;
   analog-to-digital conversion means for quantizing the analog signal in accordance with a quantization-threshold level decided by top and bottom reference voltages having values applied to said analog-to-digital conversion means, thus to produce a digital picture signal to be reproduced as an image, a digital dark current signal which corresponds to a dark current flowing through said element or a digital white level signal which corresponds to a current of a white reference flowing through said element;

bottom reference voltage generation means, on condition that said analog-to-digital conversion means produces said digital dark current signal, for outputting an initial bottom reference voltage which is preliminarily applied to said bottom reference voltage generation means, as said bottom reference voltage, and on condition that said analog-to-digital conversion means produces said digital picture signal, for converting said digital dark current signal into an analog dark current signal by digital-to-analog conversion and outputting said analog current signal as said bottom reference voltage; and top reference voltage generation means, on condition that said analog-to-digital conversion means produces said digital white level signal, for outputting an initial top reference voltage which is preliminarily applied to said top reference voltage generation means, as said top reference voltage, and on condition that said analog-to-digital conversion means produces said digital picture signal, for converting said digital white level signal into an analog white level signal by digital-to-analog conversion and outputting said analog white level signal as said top reference voltage.

2. A method of reading an object image, by an image reader consisting of a plurality of photo-electric conversion elements comprising the steps of:

quantizing a first analog signal corresponding to a dark current which flows through each element of the image reader, in accordance with a predetermined quantization-threshold level, thus the first signal becoming a digital dark current signal;

compensating the predetermined quantization-threshold level on the basis of said digital dark current signal;

quantizing a second analog signal corresponding to the optical strength of a white reference outputted from each element of the image reader in accordance with said quantization-threshold level thus compensated on the basis of said digital dark current signal, thus the second signal becoming a digital white level signal;

compensating the quantization-threshold level thus compensated on the basis of said digital dark current signal, on the basis of said digital white level signal; and quantizing a third analog signal outputted from each element of said image reader when reading said object image in accordance with the quantization-threshold level thus compensated on the basis of the digital white level signal, thus the third signal becoming a digital picture signal to be reproduced as said object image.

* * * * *